US012555205B2

United States Patent
Lee et al.

(10) Patent No.: US 12,555,205 B2
(45) Date of Patent: Feb. 17, 2026

(54) METHOD AND APPARATUS WITH IMAGE DEBLURRING

(71) Applicants: Samsung Electronics Co., Ltd., Suwon-si (KR); Seoul National University R&DB Foundation, Seoul (KR)

(72) Inventors: Huijin Lee, Pohang-si (KR); Dong-Hwan Jang, Seoul (KR); Bohyung Han, Seoul (KR); Nahyup Kang, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 591 days.

(21) Appl. No.: 17/973,809

(22) Filed: Oct. 26, 2022

(65) Prior Publication Data
US 2023/0153961 A1 May 18, 2023

(30) Foreign Application Priority Data

Nov. 15, 2021 (KR) ........................ 10-2021-0156856
Mar. 3, 2022 (KR) ........................ 10-2022-0027654

(51) Int. Cl.
*G06T 5/73* (2024.01)
*G06T 5/60* (2024.01)

(52) U.S. Cl.
CPC .................. *G06T 5/73* (2024.01); *G06T 5/60* (2024.01); *G06T 2207/20081* (2013.01); *G06T 2207/20084* (2013.01)

(58) Field of Classification Search
CPC .... G06T 5/73; G06T 5/60; G06T 5/00; G06T 2207/20081; G06T 2207/20084; G06N 3/02–0985
See application file for complete search history.

(56) References Cited

U.S. PATENT DOCUMENTS

| | | | |
|---|---|---|---|
| 8,508,606 B2 * | 8/2013 | Liu | G06T 5/73 348/241 |
| 2022/0156891 A1 * | 5/2022 | Chi | G06N 3/08 |

FOREIGN PATENT DOCUMENTS

| | | |
|---|---|---|
| CN | 112164011 A | 1/2021 |
| KR | 10-1643550 B1 | 7/2016 |

(Continued)

OTHER PUBLICATIONS

Yuan, Yuan, et al. "Efficient dynamic scene deblurring using spatially variant deconvolution network with optical flow guided training." Proceedings of the IEEE/CVF Conference on Computer Vision and Pattern Recognition. (2020). pp 3555-3564. (Year: 2020).*

(Continued)

*Primary Examiner* — Geoffrey E Summers
(74) *Attorney, Agent, or Firm* — NSIP Law

(57) ABSTRACT

An image deblurring method and apparatus are provided. The image deblurring method includes generating a primary feature representation on a first blur point in an input image and offset information on similar points of the first blur point by encoding the input image by implementing an encoding model, generating secondary feature representations on the similar points by applying the offset information to the primary feature representation, and generating an output image, based on the secondary feature representations and the offset information, by implementing an implicit function model.

21 Claims, 8 Drawing Sheets

(56) References Cited

FOREIGN PATENT DOCUMENTS

KR     10-1698876 B1     1/2017
KR     10-2056073 B1     12/2019

OTHER PUBLICATIONS

Chiang, Cheng-Ming, et al. "Deploying Image Deblurring across Mobile Devices: A Perspective of Quality and Latency." arXiv preprint arXiv:2004.12599v1 (2020). (Year: 2020).*
Dai, Jifeng, et al. "Deformable Convolutional Networks." 2017 IEEE International Conference on Computer Vision (ICCV). IEEE, 2017. (Year: 2017).*
Zhu, Xizhou, et al. "Deformable ConvNets V2: More Deformable, Better Results." 2019 IEEE/CVF Conference on Computer Vision and Pattern Recognition (CVPR). IEEE, 2019. (Year: 2019).*
Chen, Yinbo, et al. "Learning continuous image representation with function." Proceedings of the IE EE/CVF conference on computer v recognition. (2021). pp 8628-8638. (Year: 2021).*
Gong, Dong, et al. "From Motion Blur to Motion Flow: A Deep Learning Solution for Removing Heterogeneous Motion Blur." Proceedings of the IEEE conference on computer vision and pattern recognition. 2017. (Year: 2017).*
Li, Jia, et al. "Attention Enhanced Multi-patch Deformable Network for Image Deblurring." 2020 The 4th International Conference on Video and Image Processing. 2020. (Year: 2020).*
Zhang, Youjian, et al. "Exposure trajectory recovery from motion blur." IEEE Transactions on Pattern Analysis and Machine Intelligence vol. 44. Issue 11 (2021). pp 7490-7504. (Year: 2021).*
Sun, Jian, et al. "Learning a convolutional neural network for non-uniform motion blur removal." Proceedings of the IEEE conference on computer vision and pattern recognition. 2015., (9 pages).
Shen, Ziyi, et al. "Human-aware motion deblurring." Proceedings of the IEEE/CVF international conference on computer vision. 2019., (10 pages).
Korean Office Action issued on Aug. 14, 2024, in counterpart Korean Patent Application No. 10-2022-0027654 (4 pages in English, 5 pages in Korean).
Chen, Yinbo, et al. "Learning continuous image representation with local implicit image function." *Proceedings of the IEEE/CVF conference on computer vision and pattern recognition*. (2021). pp. 8628-8638.
Nah, Seungjun, et al. "Deep multi-scale convolutional neural network for dynamic scene deblurring." *Proceedings of the IEEE conference on computer vision and pattern recognition*. (2017). pp. 3883-3891.
Ramakrishnan, Sainandan, et al. "Deep generative filter for motion deblurring." *Proceedings of the IEEE international conference on computer vision workshops*. 2017. pp. 2993-3000.
Kupyn, Orest, et al. "Deblurgan: Blind motion deblurring using conditional adversarial networks." *Proceedings of the IEEE conference on computer vision and pattern recognition*. (2018). pp. 8183-8192.
Tao, Xin, et al. "Scale-recurrent network for deep image deblurring." *Proceedings of the IEEE conference on computer vision and pattern recognition*. (2018). pp. 8174-8182.
Zhang, Hongguang, et al. "Deep stacked hierarchical multi-patch network for image deblurring." *Proceedings of the IEEE/CVF Conference on Computer Vision and Pattern Recognition*. (2019). pp. 5978-5986.
Suin, Maitreya, Kuldeep Purohit, and A. N. Rajagopalan. "Spatially-attentive patch-hierarchical network for adaptive motion deblurring." *Proceedings of the IEEE/CVF Conference on Computer Vision and Pattern Recognition*. (2020). pp. 3606-3615.
Zhang, Youjian, et al. "Exposure trajectory recovery from motion blur." *IEEE Transactions on Pattern Analysis and Machine Intelligence* vol. 44. Issue 11 (2021). pp. 7490-7504.
Yuan, Yuan, et al. "Efficient dynamic scene deblurring using spatially variant deconvolution network with optical flow guided training." *Proceedings of the IEEE/CVF Conference on Computer Vision and Pattern Recognition*. (2020). pp. 3555-3564.
Mildenhall, Ben, et al. "Nerf: Representing scenes as neural radiance fields for view synthesis." *Communications of the ACM* vol. 65. Issue 1 (2021). pp. 99-106.
Lin, Chieh Hubert, et al. "InfinityGAN: Towards infinite-pixel image synthesis." arXiv preprint arXiv:2104.03963 (2021). pp. 1-14.
Purohit, Kuldeep, et al. "Region-adaptive dense network for efficient motion deblurring." *Proceedings of the AAAI Conference on Artificial Intelligence*. vol. 34. No. 07. (2020). pp. 11882-11889.
Sun, Jian, et al. "Learning a Convolutional Neural Network for Non-uniform Motion Blur Removal." Proceedings of the IEEE conference on computer vision and pattern recognition. 2015, (9 pages in English).
Gong, Dong, et al. "From Motion Blur to Motion Flow: A Deep Learning Solution for Removing Heterogeneous Motion Blur." Proceedings of the IEEE conference on computer vision and pattern recognition. 2017, (10 pages in English).
Li, Jia, et al. "Attention Enhanced Multi-patch Deformable Network for Image Deblurring." 2020 The 4th International Conference on Video and Image Processing. 2020, (6 pages in English).
Extended European search report issued on Apr. 12, 2023, in counterpart European Patent Application No. 22207036.9 (10 pages in English).

* cited by examiner

METHOD AND APPARATUS WITH IMAGE DEBLURRING

CROSS-REFERENCE TO RELATED APPLICATIONS

This application claims the benefit under 35 USC § 119(a) of Korean Patent Application No. 10-2021-0156856, filed on Nov. 15, 2021, and Korean Patent Application No. 10-2022-0027654, filed on Mar. 3, 2022, in the Korean Intellectual Property Office, the entire disclosures of which are incorporated herein by reference for all purposes.

BACKGROUND

1. Field

The following description relates to a method and apparatus with image deblurring.

2. Description of Related Art

Image restoration may refer to the restoring of an image of degraded quality to an image of improved quality. The image restoration may implement a deep learning-based neural network. A neural network may be trained based on deep learning, and then perform inference to achieve a specific purpose by mapping input data and output data that are in a non-linear relationship to each other. Such a trained capability of generating the mapping may be referred to as a learning ability of the neural network. Additionally, the neural network trained for a special purpose, such as, but not limited to, image restoration, may have a generalization ability to generate a relatively accurate output in response to an untrained input pattern.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a processor-implemented method includes generating, by implementing an encoding model, a primary feature representation on a first blur point in an input image and offset information on determined second blur points similar to the first blur point by encoding the input image; generating secondary feature representations on the second blur points by applying the offset information to the primary feature representation; and generating an output image by implementing an implicit function model based on the secondary feature representations and the offset information.

The method may further include executing computer readable code, stored in a non-transitory computer-readable storage medium, by a processor and configuring the processor, through the execution, to perform operations of generating of the primary feature representation and the offset information, the generating of the secondary feature representations, and the generating of the output image.

An output vector of the encoding model may include a first component corresponding to the primary feature representation; and a second component corresponding to the offset information.

The generating of the secondary feature representations may include generating the secondary feature representations by deforming the primary feature representation, based on offset values of the second blur points according to the offset information.

The generating of the output image may include receiving input data pairs, each pair comprising a feature representation and an offset value, based on the secondary feature representations and the offset information; estimating temporary values corresponding to the input data pairs by implementing the implicit function model with each pair of the input pairs; and determining a deblurring result value of the output image corresponding to the first blur point by combining the estimated temporary values.

The method may include detecting a blur region in the input image comprising the first blur point; and performing image restoration on the input image by implementing an image restoration model, wherein the generating of the output image comprises generating the output image by synthesizing an intermediate result image on the blur region generated by implementing the implicit function model with an intermediate result image on the input image generated by implementing the image restoration model.

The first blur point may correspond to a non-grid point that is based on a resolution that is higher than a resolution of the input image.

The method may further include determining the first blur point by implementing linear interpolation of grid points in the input image.

The encoding model and the implicit function model may correspond to a neural network model.

The method may further include generating, by implementing a temporary encoding model, a primary sample feature representation on a first sample blur point of a blur region in an input training image and generate sample offset information on second sample blur points similar to the first sample blur point by encoding the input training image with the blur region; generating secondary sample feature representations on the second sample blur points by applying the sample offset information to the primary sample feature representation; generating an output training image, based on the secondary sample feature representations and the sample offset information, by implementing a temporary implicit function model; and generate the encoding model and the implicit function model by a training of the temporary encoding model and the implicit function model such that a difference between a target image without the blur region and the output training image decreases.

The method may include training a deblurring model comprising a temporary encoding model and a temporary implicit function model; further training the temporary implicit function model while fixing the temporary encoding model; and further training the temporary encoding model while fixing the temporary implicit function model to generate the encoding model and the implicit function model.

In a general aspect, an apparatus includes a processor, configured to: generate, by implementation of an encoding model, a primary feature representation on a first blur point in an input image and offset information on determined second blur points similar to the first blur point by encoding the input image; generate secondary feature representations on the second blur points by applying the offset information to the primary feature representation; and generate an output image by implementation of an implicit function model based on the secondary feature representations and the offset information.

The apparatus may further include a memory, storing instructions that, when executed by the processor, configures the processor to perform the generating of the primary feature representation, the generating of the secondary feature representations, and the generating of the output image.

The processor may be further configured to generate the secondary feature representations by deforming the primary feature representation, based on offset values of the second blur points according to the offset information.

The processor may be further configured to receive input data pairs, each pair comprising a feature representation and an offset value, based on the secondary feature representations and the offset information; estimate temporary values corresponding to the input data pairs by implementation of the implicit function model; and generate a deblurring result value of the output image corresponding to the first blur point by combining the estimated temporary values.

The processor is further configured to detect a blur region in the input image comprising the first blur point; perform image restoration on the input image by implementation of an image restoration model; and generate the output image by synthesizing an intermediate result image on the blur region generated by the implementation of the implicit function model with an intermediate result image on the input image generated by the implementation of the image restoration model.

The first blur point may correspond to a non-grid point that is based on a resolution that is higher than a resolution of the input image.

The processor may be further configured to determine the first blur point by implementing linear interpolation of grid points in the input image.

The encoding model and the implicit function model may correspond to a neural network model.

The processor may be further configured to generate, by implementation of a temporary encoding model, a primary sample feature representation on a first sample blur point of a blur region in an input training image and generate sample offset information on second sample blur points similar to the sample blur point by encoding the input training image with the blur region; generate secondary sample feature representations on the second sample blur points by applying the sample offset information to the primary sample feature representation; generate an output training image, based on the secondary sample feature representations and the sample offset information, by implementation of a temporary implicit function model; and generate the encoding model and the implicit function model by a training of the temporary encoding model and the temporary implicit function model such that a difference between a target image, without the blur region, and the output training image decreases.

The processor may be further configured to train a deblurring model comprising a temporary encoding model and a temporary implicit function model; further train the temporary implicit function model while fixing the temporary encoding model, and further train the temporary encoding model while fixing the temporary implicit function model to generate the encoding model and the implicit function model.

The apparatus may be a smartphone, further comprising a camera and a display.

In a general aspect, a processor-implemented method includes encoding an input image including a blurred image using a machine learning encoder; extracting a feature of a first blur point and spatially-variant offset blur points from the blurred image; generating secondary feature information by deforming the extracted first blur point based on the spatially-variant offset blur points; inputting the secondary feature information and the spatially-variant offset blur points to an implicit function model; and generating an output image by implementing a machine learning the implicit function model provided the generated secondary feature information and the spatially-variant offset blur points.

The processor may be configured to detect a blur region in the input image, and perform image restoration on the input image by implementing an image restoration model.

The first blur point may be determined by implementing linear interpolation of grid points in the input image.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
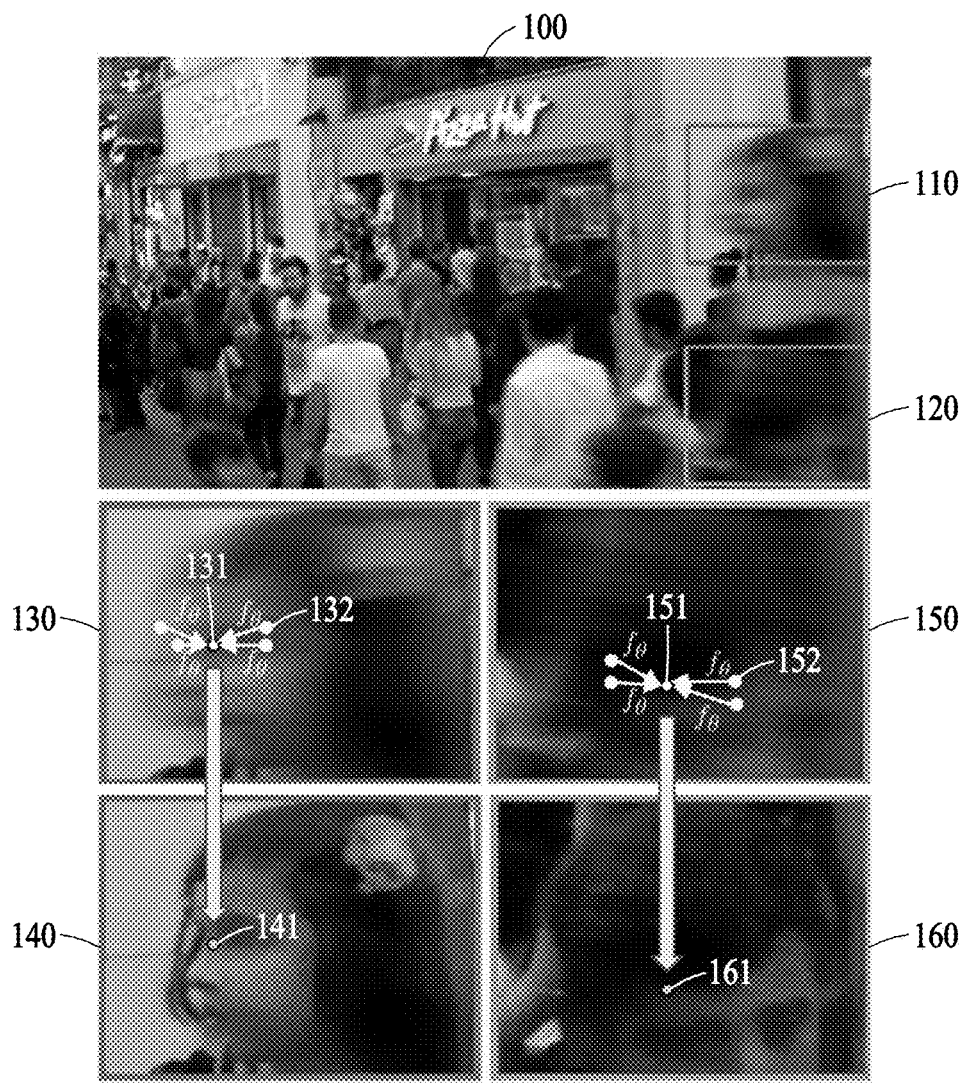
FIG. 1 illustrates an example change of a blur region in an example input image through deblurring, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 illustrates an example of a change of a blur region in an input image through the implementation of a deblurring process, in accordance with one or more embodiments.

Referring to FIG. 1, an image processing apparatus may perform a motion deblurring task on a single image, for example, an input image 100. In an example, the input image 100 may include blur regions 110 and 120. Respective first and second blur images 130 and 150 may respectively correspond to enlarged versions of the blur regions 110 and 120. In an example, a motion of a first object in the first blur image 130 may have a different aspect from a motion of a second object in the second blur image 150. In an example, a motion in a left and right direction may be dominant in the first blur image 130, and motion in a diagonal direction may be dominant in the second blur image 150. In other words, the first and second blur images 130 and 150 may respectively correspond to motion blur kernels of different features.

In an example, the image processing apparatus may perform a deblurring process by processing different features of the respective first and second blur images 130 and 150. In an example, the image processing apparatus may determine a deblurring result value (e.g., a red, green, and blue (RGB) value) of a corresponding point 141 in a first result image 140 by searching for similar points (e.g., a similar point 132) having high relevance with a query blur point 131 in the first blur image 130, and aggregating corresponding features of the query blur point 131 and the similar points. In an example, the "similar point" 132 may be blur point(s) that are positioned spatially separate from, but close to, the query blur point 131, and may therefore have a high relevance to the query blur point 131. Similarly, the image processing apparatus may determine a deblurring result value of a corresponding point 161 in a second result image 160, based on similar points (e.g., a similar point 152) of a query blur point 151 in the second blur image 150.

In an example, the image processing apparatus may derive a deblurring result value by using a feature and an offset of similar points. In an example, the feature of the similar points and the offset of the similar points may be closely related to a motion of an object. The offset may be defined as a vector having a direction and a magnitude. In an example, the offset may include information on a direction and a magnitude of a motion blur kernel. Features with different offsets may need to be differently applied. In an example, a feature with a horizontal offset and a feature with a vertical offset may be differently applied when deriving the deblurring result value.

The image processing apparatus may improve deblurring performance by actively implementing an offset. The image processing apparatus may generate an implicit function model based on an implicit feature function, and use the feature and the offset of the similar points as an input to the implicit function model. $f_\theta$ of FIG. 1 may represent an operation of the implicit function model to perform a deblurring operation on the query blur points 131 and 151, based on the feature and the offset of the respective similar points 132 and 152.

In an example, the image processing apparatus may generate primary feature representations on the query blur points 131 and 151 and offset information on similar points (e.g., the similar points 132 and 152) of the query blur points 131 and 151 by implementing an encoding model or encoder, generate secondary feature representations on the similar points by applying the offset information to the primary feature representations, and determine deblurring result values of the corresponding points 141 and 161 based on the secondary feature representations and the offset information by implementing the implicit function model.

In an example, the encoding model and the implicit function model may correspond to a neural network model. The neural network model may include, as non-limiting examples, a deep neural network (DNN) having a plurality of hidden layers. In one or more examples, the layers may include an input layer, at least one hidden layer, and an output layer. The neural network model may be configured to perform, as non-limiting examples, object classification, object recognition, and image recognition by mutually mapping input data and output data in a nonlinear relationship based on deep learning. Such deep learning is indicative of processor implemented machine learning schemes.

In an example, the DNN may be one or more of a fully connected network (FCN), a convolutional neural network (CNN), and a recurrent neural network (RNN), an attention network, a self-attention network, and the like, or may include different or overlapping neural network portions respectively with such full, convolutional, or recurrent connections, according to an algorithm used to process information, as non-limiting examples.

For example, the neural network may be, or include, as only examples, a convolutional neural network (CNN), a recurrent neural network (RNN), perceptron, feed forward (FF), a radial basis network (RBF), deep feed forward (DFF), a long short term memory (LSTM), a gated recurrent unit (GRU), an autoencoder (AE), a variational autoencoder (VAE), a denoising autoencoder (DAE), a sparse autoencoder (SAE), Markov Chain (MC), a Hopfield network (HN), a Boltzmann machine (BM), a restricted Boltzmann machine (RBM), a Depp belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN), as non-limiting examples.

In an example, a portion of the layers in a neural network may correspond to a CNN, and other portions of the layers may correspond to an FCN. In this example, the CNN may be referred to as convolutional layer(s), and the FCN may be referred to as fully connected layer(s).

In the example of the CNN, data input to each layer may be referred to as an input feature map, and data output from each layer may be referred to as an output feature map. The input feature map and the output feature map may also be referred to as activation data. When the convolutional layer corresponds to an input layer, the input feature map of the input layer may be an input image.

Technological automation of pattern recognition or analyses, for example, has been implemented through processor implemented neural network models, as specialized computational architectures, that after substantial training may provide computationally intuitive mappings between input patterns and output patterns, pattern recognitions of input patterns, as non-limited examples. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

After being trained based on deep learning, the neural network may perform inference to achieve a training purpose by mapping input data and output data that are in a non-linear relationship to each other. As a non-limiting example, such deep learning is indicative of a processor-implemented machine learning scheme, e.g., to solve a particular issue, such as, but not limited to, image recognition or voice recognition, from a big data set. The deep learning may be understood as a process that solves an optimization issue to find a point at which energy is minimized while training the neural network based on prepared training data.

By implementing learning methods such as supervised, unsupervised learning, or reinforcement learning of the deep learning, a structure of the neural network, or weights and/or other parameters corresponding to a model, may be iteratively obtained, and the input data and the output data may be mapped to each other. A neural network may be trained to infer a desired result from an arbitrary input by iteratively changing the weights of various nodes through learning or training. For example, the weights and biases of a layer structure or between layers may be collectively referred to as connectivity of a neural network. Accordingly, the training of a neural network may denote establishing and training of such weighted connectivities. When a width and a depth of the neural network are sufficiently large, the neural network may have a capacity large enough to implement an arbitrary function. The neural network may achieve optimal performance when learning a sufficiently large amount of training data by implementing an appropriate training process.

The neural network may be expressed as being trained in advance, where "in advance" means "before" an operation of the neural network begins. That the neural network "starts" means the neural network is ready for inference. For example, that the neural network "starts" may mean that the neural network is loaded in a memory, or input data for inference is input to the neural network after the neural network is loaded in the memory.

In a non-limiting example, the encoding model may have a convolutional layer-based network structure, and the implicit function model may have a fully connected layer-based network structure. In an example, the encoding model may correspond to a residual-in-residual dense block (RRDB) backbone, and the implicit function model may correspond to a multi-layer perceptron (MLP). The encoding model and the implicit function model may be trained to decrease a difference between a deblurring result generated by implementing the encoding model and the implicit function model and a target image without blur. In this example, deblurring performance may be improved by using a feature and an offset of similar points as an input to the implicit function model.

Figure 2:
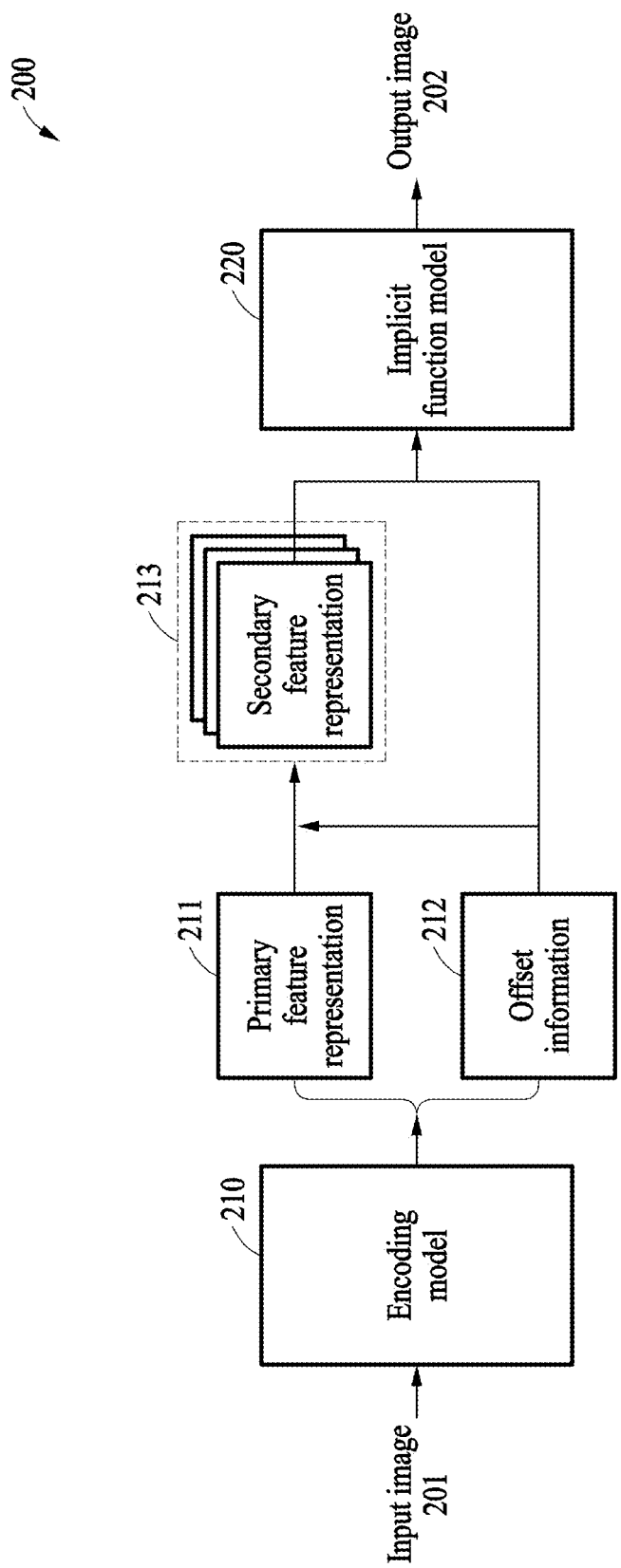
FIG. 2 illustrates an example structure of a deblurring model, in accordance with one or more embodiments.

FIG. 2 illustrates an example structure of a deblurring model, in accordance with one or more embodiments.

Referring to FIG. 2, a deblurring model 200 may include an encoding model 210 and an implicit function model 220. The encoding model 210 may generate a primary feature representation 211 and offset information 212, based on an input image 201. In an example, the input image 201 may include a blur region, (for example, blur regions 110 and 120 of FIG. 1), and the encoding model 210 may generate the primary feature representation 211 and the offset information 212 on each query blur point (for example, query blur points 131 and 151 of FIG. 1) of the blur region, (for example, blur regions 110 and 120 of FIG. 1). At least a portion of the input image 201 may be input to the encoding model 210, and the encoding model 210 may generate an output vector corresponding to an encoding result of an input. The output vector may include a first component corresponding to the primary feature representation 211 and a second component corresponding to the offset information 212. The first component may correspond to a first portion of the output vector, and the second component may correspond to a second portion of the output vector.

In an example, the primary feature representation 211 may correspond to a feature of a query blur point, and the offset information 212 may include offset values of similar points of the query blur point. A similar point may correspond to a blur point having high relevance with the query blur point. An offset value may represent an offset between the query blur point and the similar point. The offset value may correspond to a vector representation representing a direction and a magnitude of the offset. In an example, the offset value may include an x-axis coordinate value and a y-axis coordinate value according to a coordinate system of the input image 201, and the direction and the magnitude of the offset may be represented by the x-axis coordinate value and the y-axis coordinate value.

An image processing apparatus may generate secondary feature representations 213 on similar points by applying the offset information 212 to the primary feature representation 211. The image processing apparatus may generate the secondary feature representations 213 by deforming the primary feature representation 211, based on offset values of the similar points according to the offset information 212. In an example, the total number of similar points, the total number of offset values, and the total number of secondary feature representations 213 may be the same. However, this is only an example, and the total number of similar points, the total number of offset values, and the total number of secondary feature representations 213 may be different from each other. These respective total numbers may be represented by N. Each of the offset values may include an x-axis coordinate value and a y-axis coordinate value according to the coordinate system of the input image 201.

The image processing apparatus may generate an output image 202, based on the secondary feature representations 213 and the offset information 212, by implementing the implicit function model 220. The image processing apparatus may obtain input data pairs, where each input data pair includes a feature representation and an offset value, based on the secondary feature representations 213 and the offset information 212. The image processing apparatus may then estimate temporary values corresponding to the input data pairs by implementing the implicit function model 220, and determine a deblurring result value of the output image 202 corresponding to a query blur point by combining the temporary values. In an example, the output image 202 may include a corresponding region of a blur region, and the corresponding region of the output image 202 may be determined by deblurring result values on query blur points.

A deblurring result value may be determined through Equation 1 below, for example.

$$s_q = \frac{1}{N}\sum_{i=1}^{N} f_\theta(z_{x_q+\Delta x_i^*}, \Delta x_i^*)$$ Equation 1

$x_q$ denotes a position of a query blur point, q denotes an index of the query blur point, and $$\Delta x_i^*$$

denotes an ith offset.

$$z_{x_q+\Delta x_i^*}$$

denotes a deformed feature, $f_\theta$ denotes an implicit feature function, and N denotes the number of offsets. $f_\theta$ may receive an input of the deformed feature and the offsets and output a temporary value of a deblurring result.

$$z_{x_q+\Delta x_i^*}$$

may correspond to the secondary feature representations 213, and $f_\theta$ may correspond to the implicit function model 220. The image processing apparatus may determine a deblurring result value (e.g., an RGB value) of the query blur point by combining the temporary values through N offsets of the query blur point. The image processing apparatus may combine the temporary values by implementing an averaging operation. $s_q$ denotes a deblurring result value of a point of interest.

Figure 3:
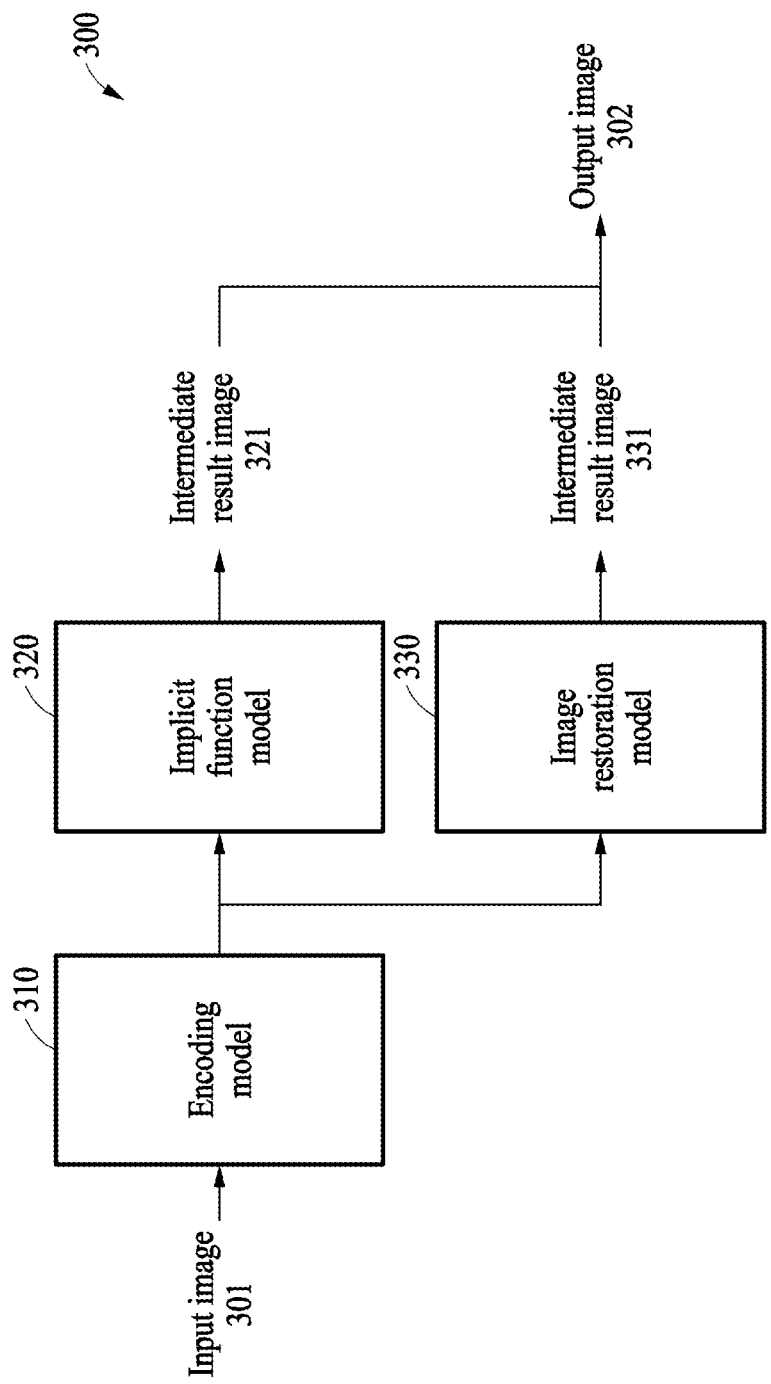
FIG. 3 illustrates an example structure of a deblurring model, in accordance with one or more embodiments.

FIG. 3 illustrates an example structure of a deblurring model, in accordance with one or more embodiments.

Referring to FIG. 3, a deblurring model 300 may include an encoding model 310, an implicit function model 320, and an image restoration model 330. In an example, the encoding model 310 of FIG. 3 may correspond to the encoding model 210 of FIG. 2. An input image 301 may include a first blur region of a first blur level and a second blur region of a second blur level. In a non-limiting example, the first blur level may correspond to a blur that is more severe than a blur of the second blur level. In an example, when the input image 301 includes motion blur that is based on a motion of an object, there may be severe blur on and around the object, compared to other regions of the input image. In this example, an object region may be the first blur region and a background region other than the object region may be the second blur region.

In an example, the implicit function model 320 may process relatively higher-level blur, such as the first blur region, and the image restoration model 330 may process relatively lower-level blur, such as the second blur region. An image processing apparatus may detect the first blur region from the input image 301, generate an intermediate result image 321 by performing deblurring on the first blur region by implementing the implicit function model 320, generate an intermediate result image 331 by performing image restoration on the input image 301 by implementing the image restoration model 330, and generate an output image 302 by synthesizing the intermediate result images 321 and 331. When the implicit function model 320 imposes an operational burden on an implementation environment, such a processing method may allow the implicit function model 320 to be implemented in an environment of relatively limited resources, such as a mobile environment, by reducing a processing range of the implicit function model 320 in the input image 301.

The encoding model 310 may generate an encoding result by encoding the input image 301, and the implicit function model 320 and the image restoration model 330 may generate the intermediate result images 321 and 331, based on the generated encoding result. In an example, the encoding model 310 may perform an operation corresponding to the encoding model 210 of FIG. 2 with a corresponding structure. In an example, the encoding model 310, for the implementation in a limited-resource environment, may have a lighter network structure than the encoding model 210 of FIG. 2 and generate an encoding result with fewer operations. In an example, the image restoration model 330 may have a convolutional layer-based network structure. In an example, the image restoration model 330 may include a small number (e.g., two) of convolutional layers. In an example, the image restoration model 330 may perform image restoration on the input image 301 by implementing a simpler operation, compared to the implicit function model 320.

In an example, the image processing apparatus may detect the first blur region by comparing the input image 301 to the intermediate result image 331. A region having a large difference between the input image 301 and the intermediate result image 331 may be a region that may not be readily restored by the image restoration model 330. The region may correspond to the first blur region, for example, blur region 110 of FIG. 1, and the image processing apparatus may generate the intermediate result image 321 by performing deblurring on the region, using the implicit function model 320.

Figure 4:
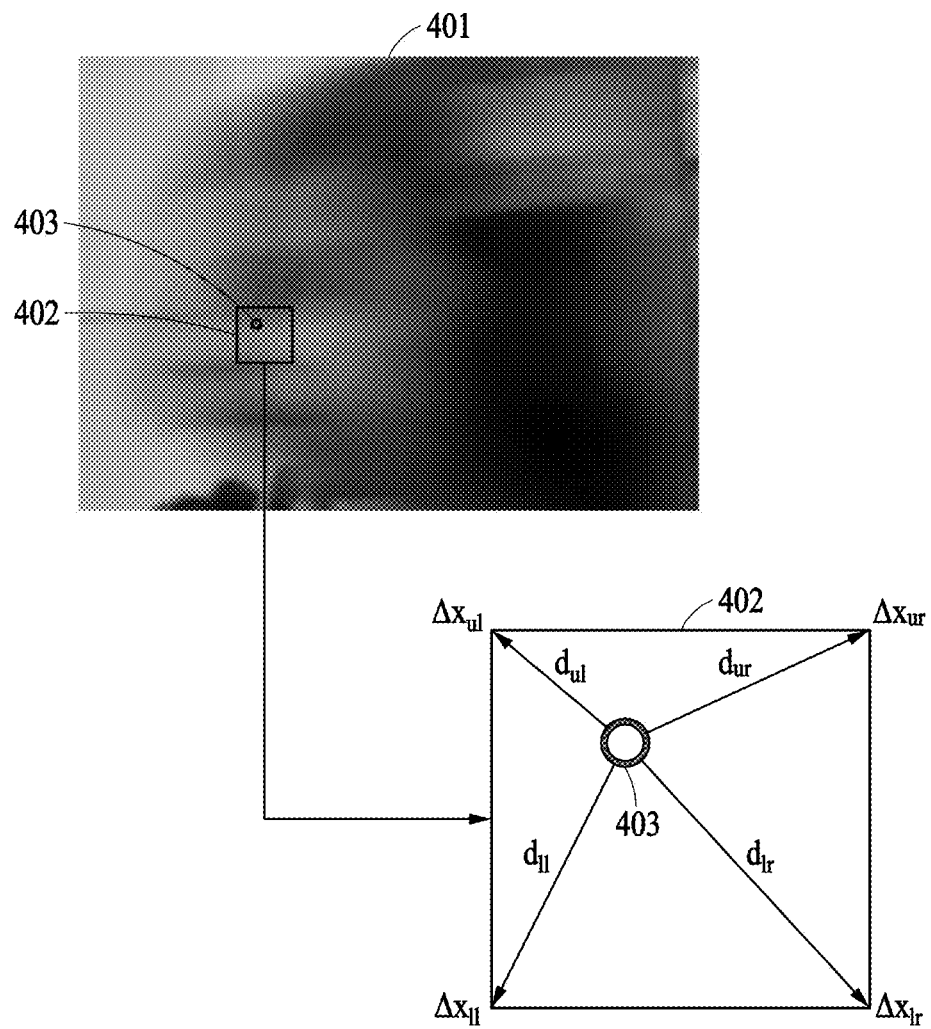
FIG. 4 illustrates an example process that derives a super resolution (SR) image, in accordance with one or more embodiments.

FIG. 4 illustrates an example process that derives a super resolution (SR) image, in accordance with one or more embodiments.

Referring to FIG. 4, a query blur point 403 may correspond to a non-grid point of a grid cell 402 in an input image 401. An image processing apparatus may generate an output image by performing interpolation and deblurring on the query blur point 403. The output image may have resolution that is higher than a resolution of the input image 401. In an example, the output image may have SR. In an example, the image processing apparatus may determine the query blur point 403 by implementing linear interpolation.

In an example, the query blur point 403 may be determined through Equation 2 below.

$$\Delta x_q = \sum_{i \in \{ul,ur,ll,lr\}} \frac{S_i}{S}(\Delta x_i + d_i)$$ Equation 2

$\Delta x_q$ denotes the query blur point 403, $\Delta x_i$ denotes a grid point of the grid cell 402, $d_i$ denotes a distance between the query blur point 403 and the grid point, $S_i$ denotes an area of a rectangle having $d_i$ as a diagonal line, i denotes an index of ul, ur, ll, and lr, and S denotes an area of the grid cell 402. As a grid point is nearer to the query blur point 403, a value of the grid point is more considerably applied in determining a value of the query blur point 403. The image processing apparatus may generate a deblurring result value on the query blur point 403 by implementing an encoding model (e.g., the encoding model 210 of FIG. 2) and an implicit function model (e.g., the implicit function model 220 of FIG. 2) and generate an SR output image by applying such a process to each pixel in the input image 401.

Generating an SR image corresponding to the input image 401 may be an ill-posed problem because there may not be sufficient information to be restored from an adjacent pixel. However, a blur image may be a set of multi-images, and such multi-images may provide a clue to solve the ill-posed problem. Therefore, the SR image may be derived by implementing deblurring.

Figure 5:
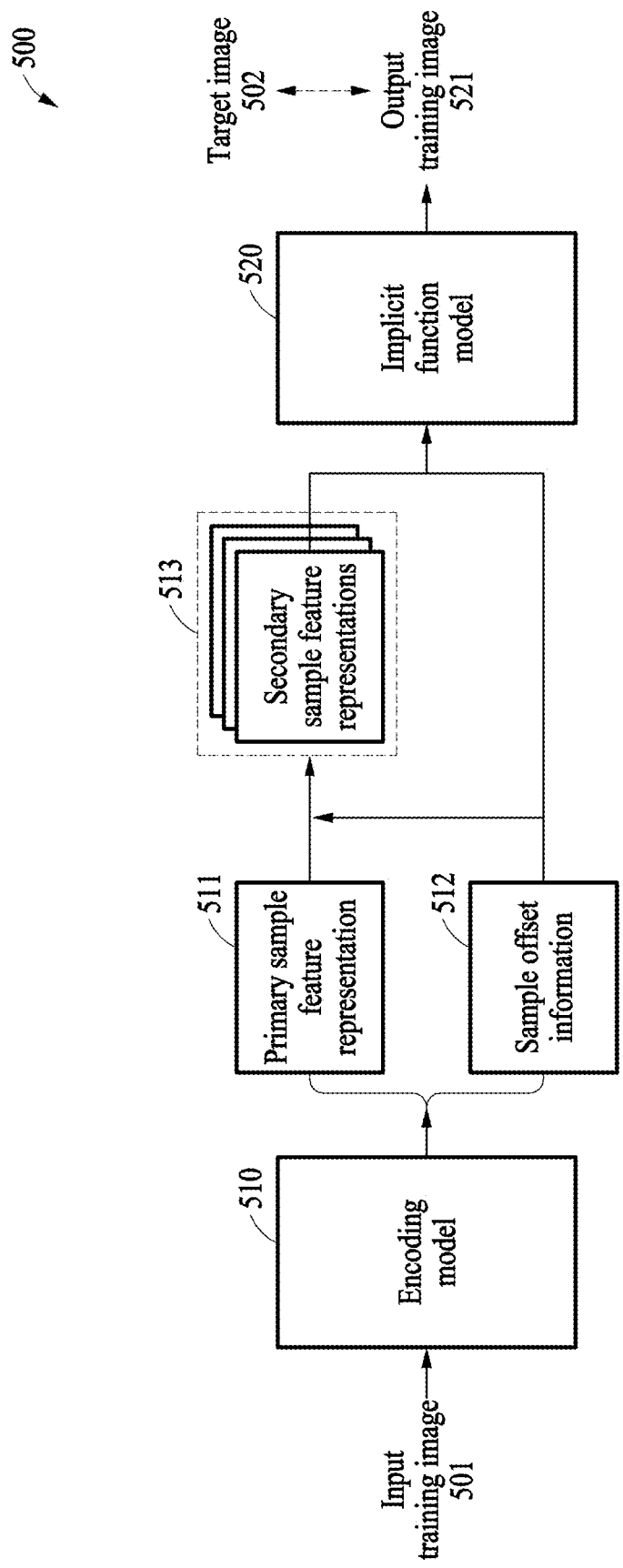
FIG. 5 illustrates an example training process for a deblurring model, in accordance with one or more embodiments.

FIG. 5 illustrates an example training process for a deblurring model, in accordance with one or more embodiments.

Referring to FIG. 5, a deblurring model 500 may include an encoding model 510 and an implicit function model 520.

As a non-limiting example, the encoding model 510 and the implicit function model 520 of FIG. 5 may respectively correspond to the encoding model 210 and the implicit function model 220 of FIG. 2, and the encoding model 310 of FIG. 3.

In an example, the encoding model 510 may encode an input training image 501 that includes a blur region, and may generate a primary sample feature representation 511 on a sample blur point of the blur region in the input training image 501 and sample offset information 512 on sample similar points of the sample blur point. The term sample may be used herein to refer to each element of a training operation to avoid confusion with an element of an inference operation. A training apparatus may generate secondary sample feature representations 513 on the sample similar points by applying the sample offset information 512 to the primary sample feature representation 511. The implicit function model 520 may generate an output training image 521, based on the secondary sample feature representations 513 and the sample offset information 512. The training apparatus may train the encoding model 510 and the implicit function model 520 such that a difference between a target image 502 without a blur region and the output training image 521 decreases. Network parameters of models, for example, the encoding model 510 and the implicit function model 520, may be updated by implementing model training.

In training the neural network model as described above, the example neural network model training apparatus may include a memory and a processor. The apparatus may include, as non-limiting examples, a laptop computer, a mobile phone, a smartphone, a tablet personal computer (PC), a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, a smart device, and the like. The smart device may include, for example, a smart watch and a smart band.

Figure 6:
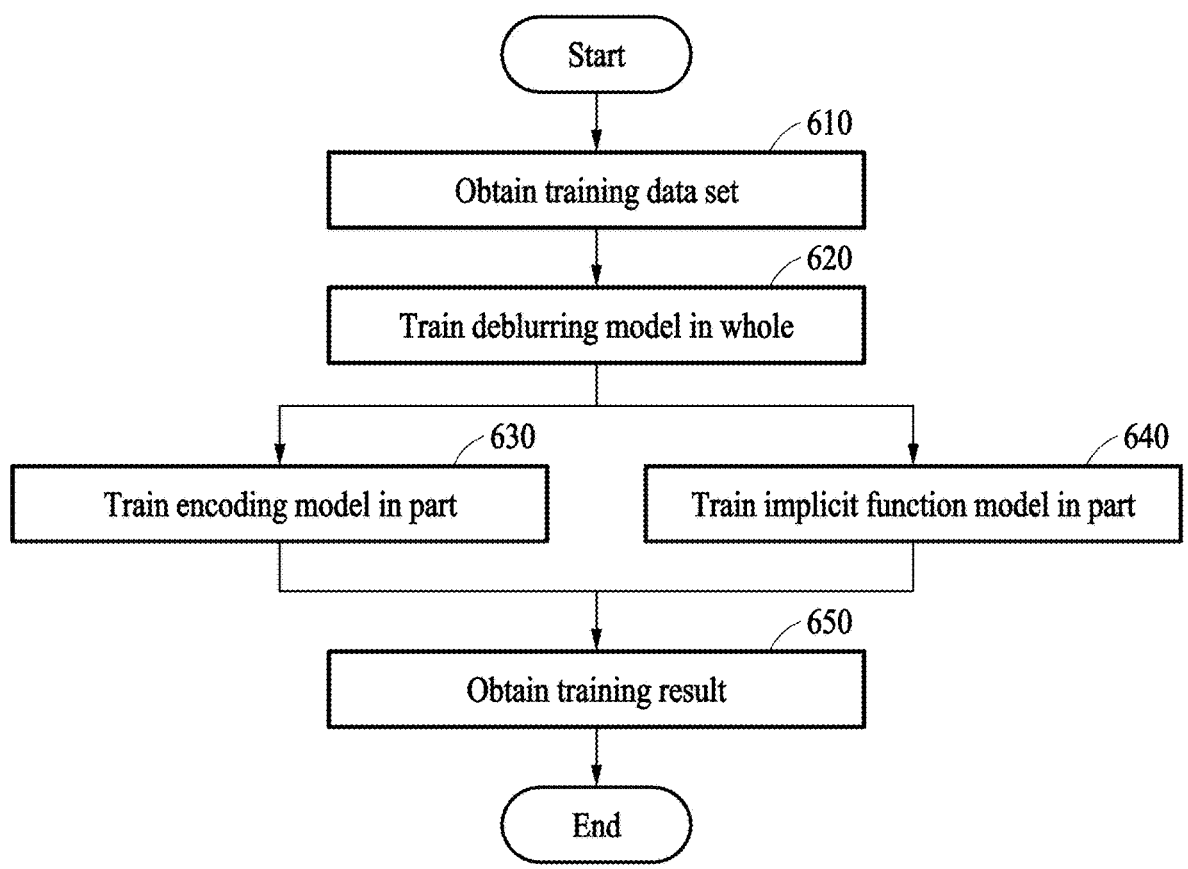
FIG. 6 illustrates an example repetition of partial training, in accordance with one or more embodiments.

FIG. 6 illustrates an example repetition of partial training, in accordance with one or more embodiments. The operations in FIG. 6 may be performed in the sequence and manner as shown. However, the order of some operations may be changed, or some of the operations may be omitted, without departing from the spirit and scope of the shown example. Additionally, operations illustrated in FIG. 6 may be performed in parallel or simultaneously. One or more blocks of FIG. 6, and combinations of the blocks, can be implemented by special purpose hardware-based computer that perform the specified functions, or combinations of special purpose hardware and instructions, e.g., computer or processor instructions. In addition to the description of FIG. 6 below, the descriptions of FIGS. 1-5 are also applicable to FIG. 6 and are incorporated herein by reference. Thus, the above description may not be repeated here for brevity purposes. The operations of FIG. 6 may be performed by a processor.

Referring to FIG. 6, in operation 610, the training apparatus may obtain a training data set. In operation 620, the training apparatus may train a deblurring model in whole. In operation 630, the training apparatus may train an encoding model in the deblurring model in part. The training apparatus may further train an implicit function model while fixing the encoding model. In operation 640, the training apparatus may train the implicit function model in the deblurring model in part. The training apparatus may further train the encoding model while fixing the implicit function model.

Operations 630 and 640 may be performed sequentially such that one operation may be performed first, and the other operation may be performed after. Any one of operations 630 and 640 may be skipped, or any one or two of operations 630 and 640 may be performed a plurality of times. For example, operation 640 may be performed first, operation 630 may be performed next, and then operation 640 may be further performed. Such partial training may reduce a training burden.

Figure 7:
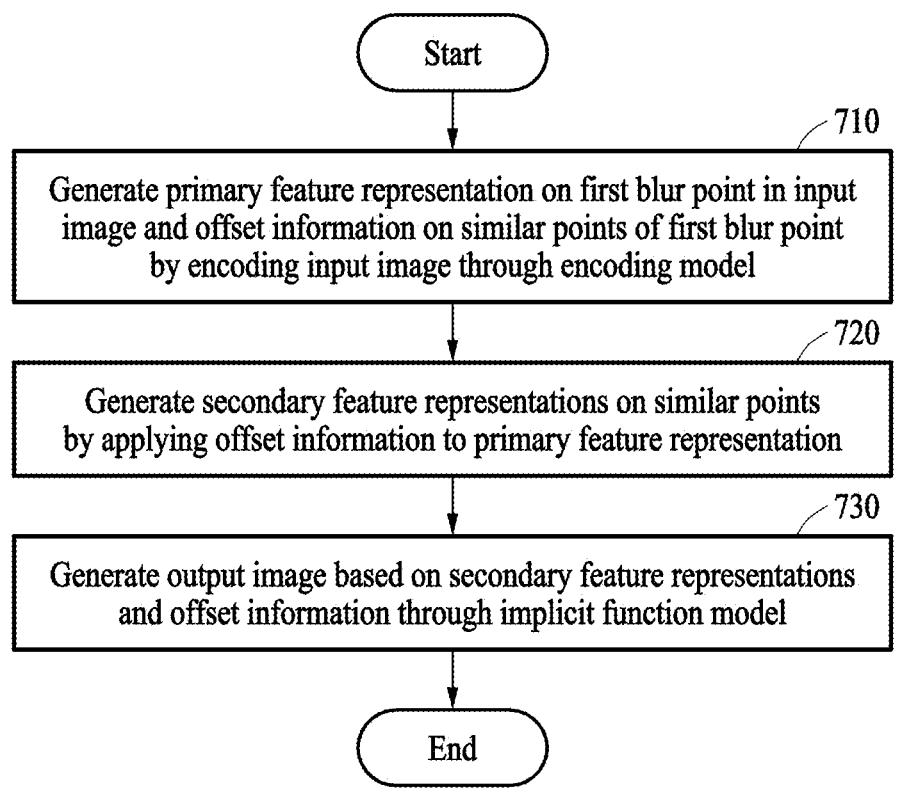
FIG. 7 illustrates an example deblurring method, in accordance with one or more embodiments.

FIG. 7 illustrates an example deblurring method, in accordance with one or more embodiments. The operations in FIG. 7 may be performed in the sequence and manner as shown. However, the order of some operations may be changed, or some of the operations may be omitted, without departing from the spirit and scope of the shown example. Additionally, operations illustrated in FIG. 7 may be performed in parallel or simultaneously. One or more blocks of FIG. 7, and combinations of the blocks, can be implemented by special purpose hardware-based computer that perform the specified functions, or combinations of special purpose hardware and instructions, e.g., computer or processor instructions. In addition to the description of FIG. 7 below, the descriptions of FIGS. 1-6 are also applicable to FIG. 7 and are incorporated herein by reference. Thus, the above description may not be repeated here for brevity purposes. The operations of FIG. 7 may be performed by a processor.

Referring to FIG. 7, in operation 710, an image processing apparatus may generate a primary feature representation on a first blur point in an input image and offset information on similar points of the first blur point by encoding the input image by implementing an encoding model or encoder. An output vector of the encoding model may include a first component corresponding to the primary feature representation and a second component corresponding to offset information.

In operation 720, the image processing apparatus may generate secondary feature representations on the similar points by applying the offset information to the primary feature representation. In an example, the image processing apparatus may generate the secondary feature representations by deforming the primary feature representation, using offset values of the similar points according to the offset information.

In operation 730, the image processing apparatus may generate an output image, based on the secondary feature representations and the offset information, by implementing an implicit function model. The image processing apparatus, based on the secondary feature representations and the offset information, may obtain input data pairs, each data pair including feature representation and an offset value, estimate temporary values corresponding to the input data pairs by implementing the implicit function model, and determine a deblurring result value of the output image corresponding to the first blur point by combining the temporary values.

The image processing apparatus may detect a blur region in the input image including the first blur point and perform image restoration on the input image by implementing an image restoration model. The image processing apparatus may generate the output image by synthesizing an intermediate result image on the blur region generated by implementing the implicit function model with an intermediate result image on the input image generated by implementing the image restoration model.

The first blur point may be a non-grid point based on resolution higher than a resolution of the input image. The image processing apparatus may determine the first blur point by implementing linear interpolation of grid points in the input image. The encoding model and the implicit function model may correspond to a neural network model.

By encoding an input training image with a blur region implementing the encoding model, the encoding model and the implicit function model may generate a primary sample feature representation on a sample blur point of the blur region of the input training image and sample offset information on sample similar points of the sample blur point, generate secondary sample feature representations on the sample similar points by applying the sample offset information to the primary sample feature representation, generate an output training image, based on the secondary sample feature representations and the sample offset information, by implementing the implicit function model, and may be trained by implementing operations of training the encoding model and the implicit function model such that a difference between a target image without the blur region and the output training image decreases.

Additionally, in an example, the encoding model and the implicit function model may be trained based on operations of training a deblurring model including the encoding model and the implicit function model, further training the implicit function model while fixing the encoding model, and further training the encoding model while fixing the implicit function model. Additionally, the description provided with reference to FIGS. 1 through 6, 8, and 9 may apply to the deblurring method of FIG. 7.

Figure 8:
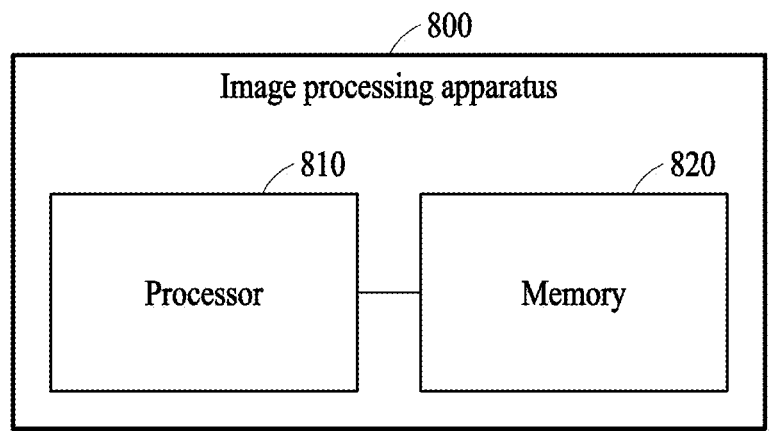
FIG. 8 illustrates an example configuration of an example image processing apparatus, in accordance with one or more embodiments.

FIG. 8 illustrates an example configuration of an image processing apparatus, in accordance with one or more embodiments.

Referring to FIG. 8, an image processing apparatus 800 may include a processor 810 and a memory 820. The memory 820 may be connected to the processor 810 and may store instructions executable by the processor 810, data to be computed by the processor 810, or data processed by the processor 810. The memory 820 may include a non-transitory computer-readable medium, for example, high-speed random-access memory (RAM), and/or a non-volatile computer-readable storage medium, for example, at least one disk storage device, a flash memory device, or other non-volatile solid-state memory devices.

The processor 810 may execute the instructions to perform the operations described above with reference to FIGS. 1 through 7 and 9. In an example, by encoding an input image by implementing an encoding model, the processor 810 may generate a primary feature representation on a first blur point in the input image and offset information on similar points of the first blur point, generate secondary feature representations on the similar points by applying the offset information to the primary feature representation, and generate an output image, based on the secondary feature representations and the offset information, by implementing an implicit function model. In addition, the description provided with reference to FIGS. 1 through 7 and 9 may apply to the image processing apparatus 800.

Figure 9:
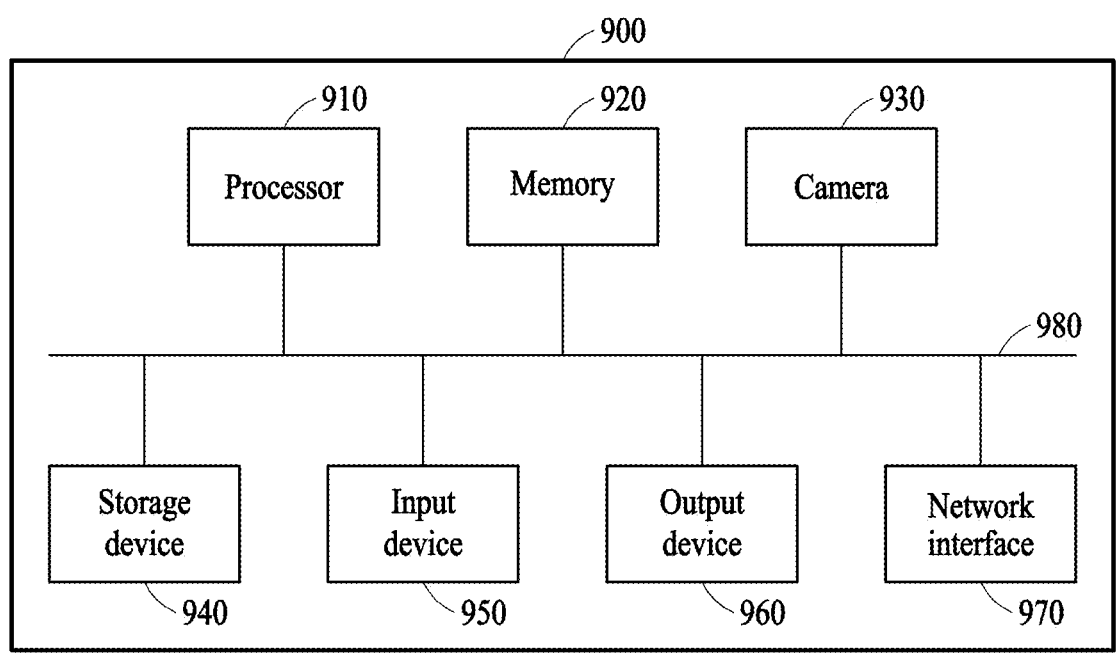
FIG. 9 illustrates an example configuration of an example electronic apparatus, in accordance with one or more embodiments.

FIG. 9 illustrates an example configuration of an electronic apparatus.

Referring to FIG. 9, an electronic apparatus 900 may include a processor 910, a memory 920, a camera 930, a storage device 940, an input device 950, an output device 960, and a network interface 970, and these components may communicate with each other through a communication bus 980. In an example, the electronic apparatus 900 may be implemented as at least a part of a mobile device, such as a mobile phone, a smartphone, a personal digital assistant (PDA), a netbook, a tablet computer, or a laptop computer, a wearable device, such as a smart watch, a smart band, or smart glasses, a computing device, such as a desktop or a server, a home appliance, such as a television, a smart television, or a refrigerator, a security device, such as a door lock, or a vehicle, such as an autonomous vehicle or a smart vehicle. The electronic apparatus 900 may include, structurally and/or functionally, an image processing apparatus (e.g., the image processing apparatus 800 of FIG. 8) and/or a training apparatus.

The processor 910 may execute instructions in the electronic apparatus 900. In an example, the processor 910 may process instructions stored in the memory 920 or the storage device 940. The processor 910 may perform the operations described with reference to FIGS. 1 through 8. The memory 920 may include a non-transitory computer-readable storage medium or a non-transitory computer-readable storage device. The memory 920 may store instructions to be executed by the processor 910 and store information associated with software and/or applications when the software and/or the applications are being executed by the electronic apparatus 900.

The camera 930 may capture a photo and/or a video. The storage device 940 may include a non-transitory computer-readable storage medium or a non-transitory computer-readable storage device. In an example, the storage device 940 may store a greater amount of information for a longer period than the memory 920. In a non-limited example, the storage device 940 may include a magnetic hard disk, an optical disc, a flash memory, a floppy disk, or other types of non-volatile memories.

The input device 950 may receive an input from a user through a traditional input scheme using a keyboard and a mouse, and through a new input scheme, such as a touch input, a voice input, and an image input. In an example, the input device 950 may detect an input from a keyboard, a mouse, a touchscreen, a microphone, or a user, and may include any other device configured to transfer the detected input to the electronic apparatus 900. The output device 960 may provide a user with an output of the electronic apparatus 900 through a visual channel, an auditory channel, or a tactile channel. The output device 960 may include, for example, a display, a touchscreen, a speaker, a vibration generator, or any other device configured to provide a user with the output. The network interface 970 may communicate with an external device via a wired or wireless network.

The processors 810 and 910, memories 820 and 920, camera 930, storage device 940, input device 950, output device 960, network interface 970, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-9, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
   generating, by implementing an encoding model, a primary feature representation on a first blur point in an input image and offset information on determined second blur points similar to the first blur point by encoding the input image;
   generating secondary feature representations on the second blur points by applying the offset information to the primary feature representation; and
   generating an output image by implementing an implicit function model based on the secondary feature representations and the offset information,
   wherein the generating of the output image comprises:
   receiving input data pairs, each pair comprising a feature representation and an offset value, based on the secondary feature representations and the offset information;
   estimating temporary values corresponding to the input data pairs by implementing the implicit function model with each pair of the input pairs; and
   determining a deblurring result value of the output image corresponding to the first blur point by combining the estimated temporary values.

2. The method of claim 1, further comprising executing computer readable code, stored in a non-transitory computer-readable storage medium, by a processor and configuring the processor, through the execution, to perform operations of generating of the primary feature representation and the offset information, the generating of the secondary feature representations, and the generating of the output image.

3. The method of claim 1, wherein:
   an output vector of the encoding model comprises:
      a first component corresponding to the primary feature representation; and
      a second component corresponding to the offset information.

4. The method of claim 1, wherein the generating of the secondary feature representations comprises generating the secondary feature representations by deforming the primary feature representation, based on offset values of the second blur points according to the offset information.

5. The method of claim 1, further comprising:
   detecting a blur region in the input image comprising the first blur point; and
   performing image restoration on the input image by implementing an image restoration model,
   wherein the generating of the output image comprises generating the output image by synthesizing an intermediate result image on the blur region generated by implementing the implicit function model with an intermediate result image on the input image generated by implementing the image restoration model.

6. The method of claim 1, wherein the first blur point corresponds to a non-grid point that is based on a resolution that is higher than a resolution of the input image.

7. The method of claim 6, further comprising determining the first blur point by implementing linear interpolation of grid points in the input image.

8. The method of claim 1, wherein the encoding model and the implicit function model correspond to a neural network model.

9. The method of claim 1, further comprising:
   generating, by implementing a temporary encoding model, a primary sample feature representation on a first sample blur point of a blur region in an input training image and generate sample offset information on second sample blur points similar to the first sample blur point by encoding the input training image with the blur region;

generating secondary sample feature representations on the second sample blur points by applying the sample offset information to the primary sample feature representation;
generating an output training image, based on the secondary sample feature representations and the sample offset information, by implementing a temporary implicit function model; and
generate the encoding model and the implicit function model by a training of the temporary encoding model and the implicit function model such that a difference between a target image without the blur region and the output training image decreases.

10. The method of claim 1, further comprising:
training a deblurring model comprising a temporary encoding model and a temporary implicit function model;
further training the temporary implicit function model while fixing the temporary encoding model; and
further training the temporary encoding model while fixing the temporary implicit function model to generate the encoding model and the implicit function model.

11. A non-transitory computer-readable storage medium storing instructions that, when executed by a processor, cause the processor to perform the method of claim 1.

12. An apparatus, comprising:
a processor, configured to:
generate, by implementation of an encoding model, a primary feature representation on a first blur point in an input image and offset information on determined second blur points similar to the first blur point by encoding the input image;
generate secondary feature representations on the second blur points by applying the offset information to the primary feature representation; and
generate an output image by implementation of an implicit function model based on the secondary feature representations and the offset information,
wherein the generation of the output image comprises:
receive input data pairs, each pair comprising a feature representation and an offset value, based on the secondary feature representations and the offset information;
estimate temporary values corresponding to the input data pairs by implementation of the implicit function model with each pair of input pairs; and
determine a deblurring result value of the output image corresponding to the first blur point by combining the estimated temporary values.

13. The apparatus of claim 12, further comprising a memory, storing instructions that, when executed by the processor, configures the processor to perform the generating of the primary feature representation, the generating of the secondary feature representations, and the generating of the output image.

14. The apparatus of claim 12, wherein the processor is further configured to generate the secondary feature representations by deforming the primary feature representation, based on offset values of the second blur points according to the offset information.

15. The apparatus of claim 12, wherein the processor is further configured to:
detect a blur region in the input image comprising the first blur point;
perform image restoration on the input image by implementation of an image restoration model; and
generate the output image by synthesizing an intermediate result image on the blur region generated by the implementation of the implicit function model with an intermediate result image on the input image generated by the implementation of the image restoration model.

16. The apparatus of claim 12, wherein the first blur point corresponds to a non-grid point that is based on a resolution that is higher than a resolution of the input image.

17. The apparatus of claim 16, wherein the processor is further configured to determine the first blur point by implementing linear interpolation of grid points in the input image.

18. The apparatus of claim 12, wherein the encoding model and the implicit function model correspond to a neural network model.

19. The apparatus of claim 12, wherein the processor is further configured to:
generate, by implementation of a temporary encoding model, a primary sample feature representation on a first sample blur point of a blur region in an input training image and generate sample offset information on second sample blur points similar to the sample blur point by encoding the input training image with the blur region;
generate secondary sample feature representations on the second sample blur points by applying the sample offset information to the primary sample feature representation;
generate an output training image, based on the secondary sample feature representations and the sample offset information, by implementation of a temporary implicit function model; and
generate the encoding model and the implicit function model by a training of the temporary encoding model and the temporary implicit function model such that a difference between a target image, without the blur region, and the output training image decreases.

20. The apparatus of claim 12, wherein the processor is further configured to:
train a deblurring model comprising a temporary encoding model and a temporary implicit function model;
further train the temporary implicit function model while fixing the temporary encoding model, and
further train the temporary encoding model while fixing the temporary implicit function model to generate the encoding model and the implicit function model.

21. The apparatus of claim 12, wherein the apparatus is a smartphone, further comprising a camera and a display.

* * * * *